(12) United States Patent
Sugar (10) Patent No.: US 8,886,210 B1
(45) Date of Patent: Nov. 11, 2014

(54) RESOLVING AMBIGUITY WITH RESPECT TO LOCATIONING AND CLASSIFICATION OF WIRELESS TRANSMITTERS

(75) Inventor: Gary L. Sugar, Cleveland, OH (US)

(73) Assignee: Cisco Technology, Inc., San Jose, CA (US)

( * ) Notice: Subject to any disclaimer, the term of this patent is extended or adjusted under 35 U.S.C. 154(b) by 1907 days.

(21) Appl. No.: 12/014,286

(22) Filed: Jan. 15, 2008

Related U.S. Application Data (60) Provisional application No. 60/885,060, filed on Jan. 16, 2007.

(51) Int. Cl.
*H04W 24/00* (2009.01)

(52) U.S. Cl.
USPC .................................. 455/456.1; 455/456.2

(58) Field of Classification Search
USPC .......................................... 455/456.1, 456.2
See application file for complete search history.

(56) References Cited

U.S. PATENT DOCUMENTS

| | | | |
|---|---|---|---|
| 6,332,076 B1 | 12/2001 | Shah et al. | |
| 6,674,403 B2 | 1/2004 | Gray et al. | |
| 6,850,735 B2 | 2/2005 | Sugar et al. | |
| 6,990,428 B1 * | 1/2006 | Kaiser et al. | 702/150 |
| 7,006,838 B2 | 2/2006 | Diener et al. | |
| 7,035,593 B2 | 4/2006 | Miller et al. | |
| 7,116,943 B2 | 10/2006 | Sugar et al. | |
| 7,171,161 B2 | 1/2007 | Miller | |
| 7,184,777 B2 | 2/2007 | Diener et al. | |
| 7,236,128 B2 | 6/2007 | Sugar et al. | |
| 7,317,419 B2 | 1/2008 | Sugar et al. | |
| 7,319,877 B2 * | 1/2008 | Krumm et al. | 455/456.3 |
| 2003/0123420 A1 | 7/2003 | Sherlock | |
| 2003/0198200 A1 | 10/2003 | Diener et al. | |
| 2004/0102198 A1 | 5/2004 | Diener et al. | |
| 2004/0166835 A1 * | 8/2004 | Johansson et al. | 455/414.1 |
| 2004/0203872 A1 * | 10/2004 | Bajikar | 455/456.1 |
| 2005/0002473 A1 | 1/2005 | Kloper et al. | |
| 2005/0003828 A1 | 1/2005 | Sugar et al. | |
| 2005/0128989 A1 | 6/2005 | Bhagwat et al. | |
| 2005/0176406 A1 * | 8/2005 | Krishnakumar et al. | 455/410 |
| 2005/0227625 A1 | 10/2005 | Diener | |
| 2005/0285793 A1 * | 12/2005 | Sugar et al. | 342/465 |
| 2006/0128311 A1 | 6/2006 | Tesfai | |
| 2006/0146953 A1 * | 7/2006 | Raghothaman et al. | 375/267 |

* cited by examiner

*Primary Examiner* — Omoniyi Obayanju
(74) *Attorney, Agent, or Firm* — Edell, Shapiro & Finnan, LLC (57) ABSTRACT

Techniques are provided for distinguishing between different signal sources where multiple sensor devices receive RF energy in an area such that some sensors may receive the signals from the same source device. One technique involves using a received signal strength (RSS)-based positioning technique to distinguish between sources. Another technique involves building a pseudo-MAC identifier from received transmissions of a device in order to distinguish transmissions from that device with respect to other devices. Still another technique involves synchronizing the sensor devices and examining the resulting waveform data at each of the sensor devices to determine if they match sufficiently to indicate that they are from the same source device.

7 Claims, 10 Drawing Sheets

RESOLVING AMBIGUITY WITH RESPECT TO LOCATIONING AND CLASSIFICATION OF WIRELESS TRANSMITTERS

RELATED APPLICATION

This application claims priority to U.S. Provisional Application No. 60/885,060, filed Jan. 16, 2007, the entirety of which is incorporated herein by reference.

BACKGROUND OF THE INVENTION

The explosive growth in wireless applications and devices over the past few years has produced tremendous public interest benefits. Wireless networks and devices have been deployed in millions of offices, homes, and more recently, in increasing numbers of public areas. These wireless deployments are forecast to continue at an exciting pace and offer the promise of increased convenience and productivity.

This growth, which is taking place mostly in the unlicensed bands, is not without its downsides. In the United States, the unlicensed bands established by the FCC consist of large portions of spectrum at 2.4 GHz and at 5 GHz, which are free to use. The FCC currently sets requirements for the unlicensed bands such as limits on transmit power spectral density and limits on antenna gain. It is well recognized that as unlicensed band devices become more popular and their density in a given area increases, a "tragedy of the commons" effect will often become apparent and overall wireless utility (and user satisfaction) will collapse. This phenomenon has already been observed in environments that have a high density of wireless devices.

Enterprise uses of the unlicensed band are focused on larger scale deployment of wireless networks (e.g., WLANs) and integration into wired networks. WLANs can complicate existing network management schemes because they introduce the additional requirement of efficiently managing radio spectrum. Current WLAN systems and management technology are focused on managing activity at the network level of the WLAN, but provide little or no capability to manage the frequency band where signals of multiple types (e.g., communication protocol/network types, device types, etc.) are present.

The types of signaling protocols used by devices in the unlicensed bands are not designed to cooperate with signals of other types also operating in the bands. For example, a frequency hopping signal (e.g., a signal emitted from a device that uses the Bluetooth™ communication protocol or a signal emitted from certain cordless phones) may hop into the frequency channel of an IEEE 802.11 wireless local area network (WLAN), causing interference with operation of the WLAN. Thus, technology is needed to exploit all of the benefits of the unlicensed band without degrading the level of service that users expect.

Techniques are needed to assist in distinguishing between different wireless transmitter devices in a shared radio frequency band environment.

DESCRIPTION OF EXAMPLE EMBODIMENTS

Overview

Techniques are provided to resolve ambiguity with respect to the association of receive signal strength (RSS) measurement data received at multiple receiver devices with the wireless transmitter devices that are the sources of the RF energy received by the receiver devices to produce the RSS measurements. These techniques are useful when address or other identifier information cannot be obtained from the received signals associated with the transmissions from the wireless transmitters. One method disclosed herein involves estimating the number of different wireless transmitters in a vicinity of a plurality of known locations based on radio frequency (RF) energy received from the wireless transmitters at the plurality of known locations. An RSS observation vector is built for each wireless transmitter, wherein elements of the RSS observation vector comprise RSS measurements made at each of the plurality of known locations. Permutations of elements of the RSS observation vectors and the corresponding location for each wireless transmitter are determined that minimize a cost function between the RSS observation vectors and corresponding modeled RSS vectors that are based on a path loss model. Another technique involves receiving radio frequency energy that includes a wireless transmission from at least one device; demodulating the received radio frequency energy to produce a demodulated signal; examining the bits in the demodulated signal for multiple instances of wireless transmissions; identifying bit fields that are constant or nearly constant across multiple instances of wireless transmissions; and building an identifier from the bit fields that are constant for identifying presence of a wireless transmission from the device. Still another technique involves synchronizing a plurality of receiver devices to a common time base. Multiple wireless transmissions are received at each of the receiver device. Data associated with reception of the wireless transmissions at each of the receiver devices is analyzed to determine whether the received wireless transmissions at the plurality of receiver devices are from the same device or are from multiple devices.

The term "network" is used hereinafter in many ways. There may be one or more wireless networks each comprising multiple devices or nodes that operate in the shared frequency band. One example of such a network is a WLAN. There are also networks, called piconets, which are formed with Bluetooth™ (master and slave) devices. Many of the examples described herein are made with respect to an IEEE 802.11 (also known as WiFi™) WLAN, mostly due in part to the expansive use that the WLAN has seen, and is expected to continue to see. In addition, the term network is referred to a wired network, and to an aggregation of one or more wired and wireless networks. The systems, methods, software and device features described herein are not limited to any particular wireless network, and are equally applicable to any wireless network technologies now known or hereinafter developed.

Figure 1:
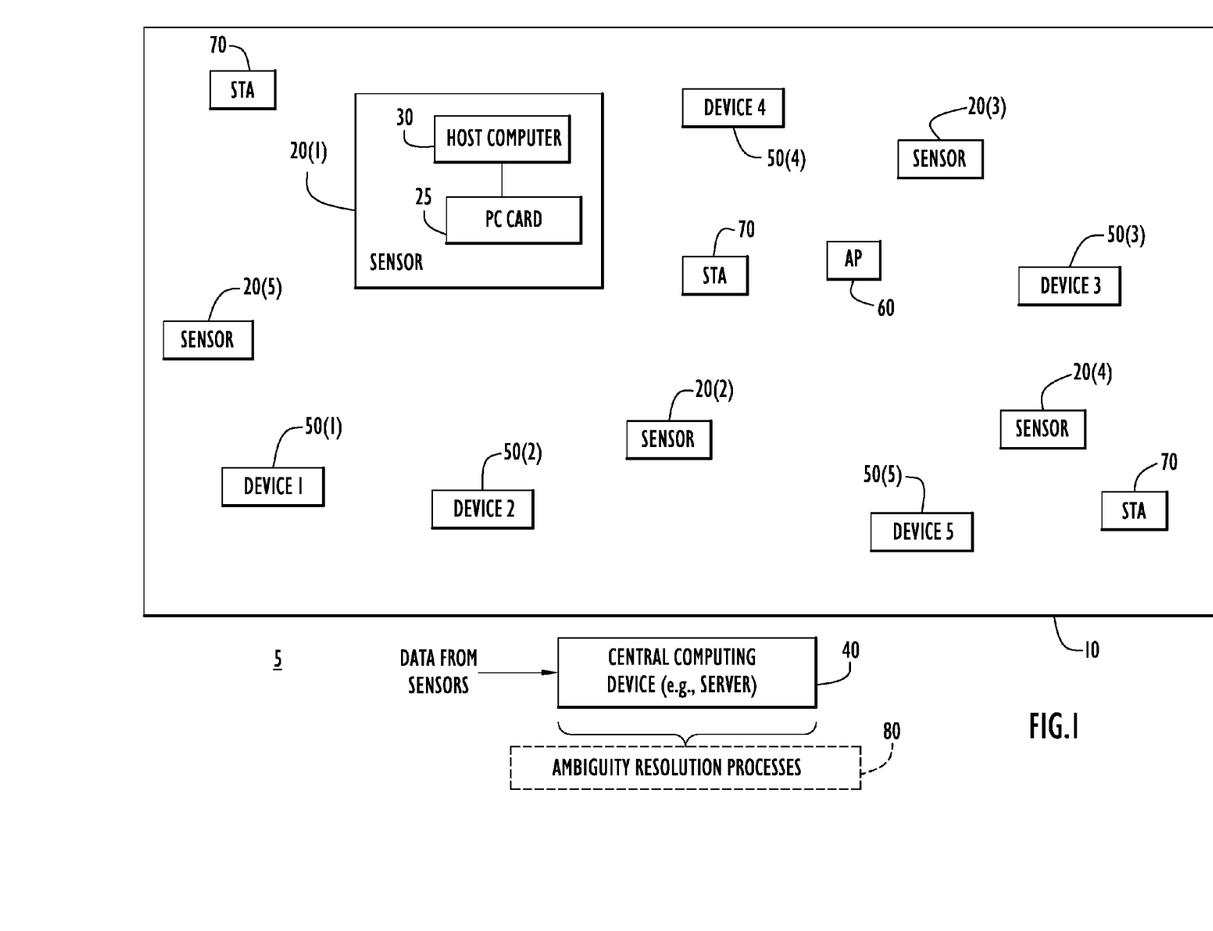
FIG. 1 is a block diagram of a system in which the positions of sources of radio emissions can be determined using a plurality of radio receiver sensor devices and a server computing device.

Referring first to FIG. 1, a system 5 is shown comprising one or more radio sensor devices, hereinafter simply called sensors, 20(1)-20(5) that are positioned throughout a region of interest 10. The region of interest may be inside a building or in an outdoor environment. Each sensor device 20(1)-20(5) is a receiver device that may take on the form of a card device 25 and a host computing device 30, e.g., a personal computer. Alternatively, the functions of the card device 25 and host computing device 30 may be integrated into a single unit. One or more of the sensors may report data to a central computing device or server 40 via a wired or wireless link (not shown for simplicity). There are one or more wireless transmitter devices, shown at reference numerals 50(1) to 50(5), that may be transmitting or emitting radio frequency (RF) energy in the region of interest 10 and it is desirable to be able to distinguish between and locate these devices based on RF energy received by at least one of the sensors 20(1)-20(5). While FIG. 1 shows that there are five sensors and five wireless transmitter devices, it should be understand that this is only by way of example and that the number of sensors and wireless transmitters to be located may vary. The wireless transmitter devices 50(1) to 50(5) are also referred to herein as target devices (TDs).

The sensors 20(1) to 20(5) are deployed at appropriate positions in the area 10. Also shown are an access point (AP) 60 and a plurality of client stations (STAs) 70 or mobile devices that operate in compliance with a particular communication protocol, such as an IEEE 802.11 WLAN protocol. The target devices 50(1)-50(5) may or may not operate according to this communication protocol. It is desirable to determine the positions of the target devices 50(1)-50(5). It should be understood that an AP may include the functionality of a sensor such that the AP can function as both an AP and a sensor. Said another way, each of the sensors 20(1)-20(5) may also be APs.

When a position computation estimate is to be performed for a radio emission source, e.g., one of the target wireless transmitter devices 50(1)-50(5), the server 40 uses a set of RSS measurement data consisting of RSS data associated with reception of the radio emission(s) from that source at all or a subset of the sensors 20(1)-20(5). The server 40 executes one or more ambiguity resolution process(es) shown at 80 to resolve ambiguity associated with the RSS measurement data by determining which RSS measurement is associated with which source device detected by a sensor. The ambiguity resolution processes 80 may involve any one or more of the techniques described hereinafter.

Figure 2:
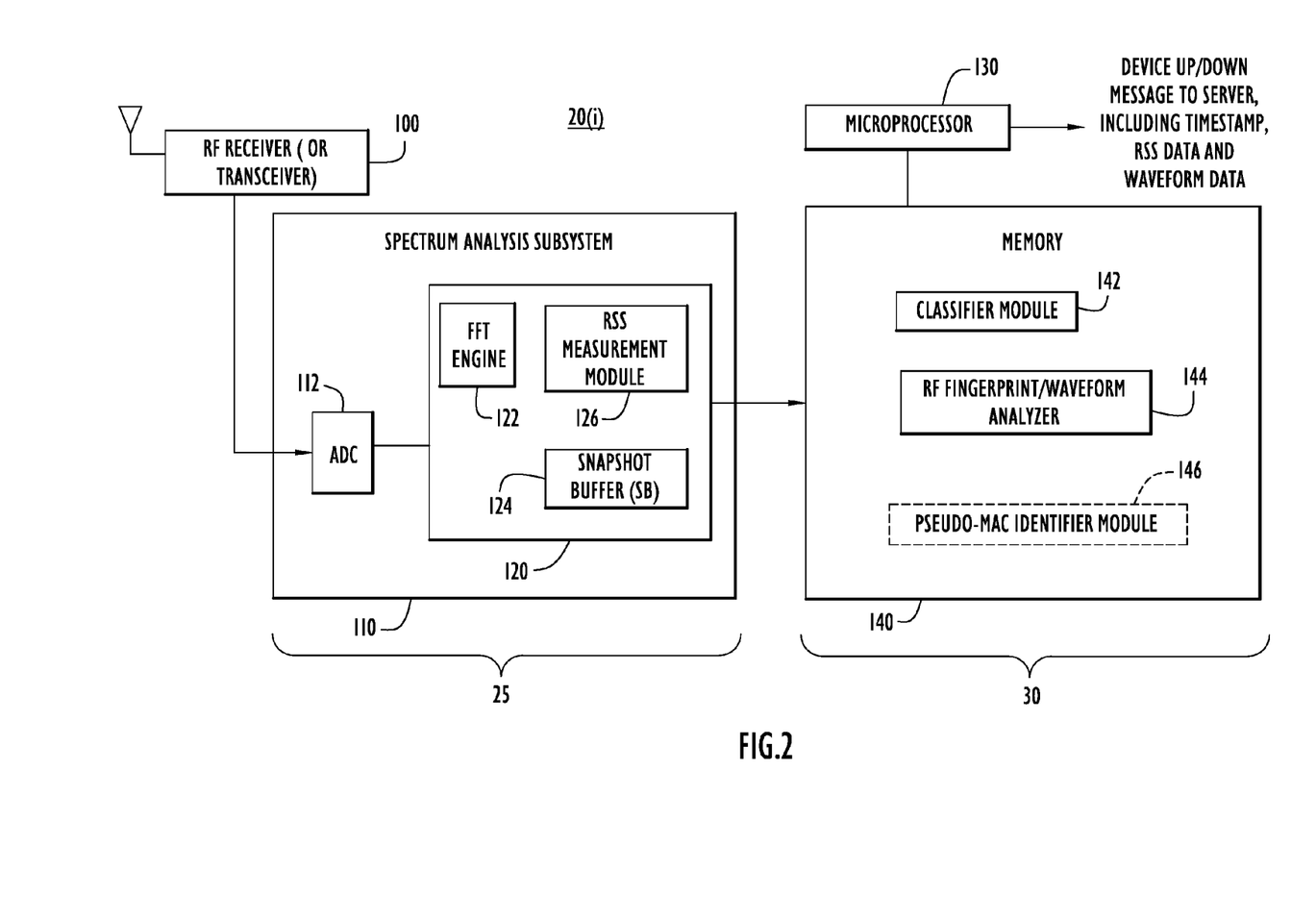
FIG. 2 is a block diagram of a radio receiver sensor device.

Turning to FIG. 2, a block diagram of the relevant components of a sensor 20(i) is described. FIG. 2 is just one example of many possible configurations for the hardware and software components for performing the techniques of the present invention. If an AP is equipped to function as a sensor, then there would be additional blocks in that device to perform the standard AP functions and those blocks are not shown in FIG. 2 for simplicity. The card 25 of the sensor device comprises an RF receiver 100 (or transceiver depending on the form factor of the sensor) and a spectrum analysis subsystem 110. The spectrum analysis subsystem 110 comprises an analog-to-digital converter (ADC) 112, a digital analysis circuit 120. The ADC 112 receives the analog baseband signal produced by the RF receiver 100 that contains the amplitude and phase of the received signal. The ADC 112 converts the analog baseband signal to a digital signal for analysis by the digital analysis circuit 120. The receiver (or transceiver 100) may be tuned to a particular channel using standard tuning/control techniques and also may be scanned across a frequency range in order to capture RF energy within a predetermined portion of the frequency range for a period of time (dwell time), and then move to a next portion of the frequency range for a period of time and so on. A receiver 100 with this capability is referred to herein as a scanning receiver.

The digital analysis circuit 120 comprises a Fast Fourier Transform (FFT) engine 122, a snapshot buffer (SB) 124 and a RSS measurement module 126. The FFT engine 122 generates real-time power spectral data. The snapshot buffer 124 stores a segment of received (I/Q) waveform samples over time. Examples of a spectrum analysis subsystem are described in commonly assigned U.S. Pat. Nos. 7,292,656 and 6,714,605, the entirety of each of which are incorporated herein by reference.

The digital analysis circuit 120 may be implemented as a plurality of digital logic gates on an integrated circuit (IC) in a very large system integration (VLSI) implementation, such as on an application specification IC (ASIC). Alternatively, it should be understood that the functions of the digital analysis circuit 120 may be implemented by software in the host computing device 30.

The output data from the spectrum analysis subsystem 110 comprises RSS measurement data, FFT data (if desired) and data stored in the snapshot buffer 124. The spectrum analysis subsystem 110 may further perform pulse identification functions, such as those disclosed in commonly assigned and co-pending U.S. Patent Application Publication No. US 2007-0264939 A1, entitled "System and Method for Identifying Wireless Devices Using Pulse Fingerprinting and Sequence Analysis," the entirety of which is incorporated herein by reference. For example, the spectrum analysis subsystem 110 may generate pulse event records, where each pulse event record comprises data identifying the start time, duration, power, carrier frequency, and bandwidth of a pulse, as well as data pointing to the location in the snapshot buffer where the raw digital data is located for the I/Q waveform associated with a pulse.

The host computing device 30 comprises a microprocessor 130 and memory 140. The microprocessor 130 and memory 140 may be integrated on a single system-on-chip (SOC) or may be separate components in a device, such as a laptop computer. The memory 140 is a computer readable medium that stores the software instructions for performing some of the techniques described herein. The software instructions may be viewed as separate modules and include, for example, a classifier module 142, an RF fingerprint/waveform analysis module 144 and a pseudo-MAC identifier module 146. The microprocessor 130 executes the software stored in the memory 140 for the classifier module 142 to classify/identify wireless transmitter devices from received RF energy and generates device-up and device-down messages associated with detection of wireless transmitter devices. Examples of classification techniques are described in the aforementioned pending published patent application, and in commonly assigned U.S. Pat. Nos. 6,850,735; 7,035,593; 7,116,943; and 7,171,161, the entirety of each of which is incorporated herein by reference. A "device up" message indicates the name of a wireless transmitter device that is detected and a device down message indicates the name of a device that was previously being detected and tracked that is no longer detected. The microprocessor 140 also generates messages indicating the timestamp (time of occurrence), RSS measurement data and waveform data associated with RF energy for a detected transmission from wireless transmitter device. The function of the pseudo-MAC identifier module 146 is described hereinafter in conjunction with FIGS. 6 and 7.

Cost Function-Based Location and Ambiguity Resolving

In one embodiment, the ambiguity resolution process 80 may comprise a particular computation made during execution of an RSS-based location procedure used to determine the location of various devices. The cost function used in a RSS-based location computation may be used to resolve the ambiguity when signals from multiple devices are occurring.

Consider the example where there are two "generic" devices, device 1 and device 2 (made from the same manufacturer) that are turned on at generally the same time and begin transmitting. In this example, there are six sensors that detect the signals from both devices. The location server receives two RSS 6-vectors, r1 and r2, containing signal strength measurements for signals from both devices made by each of the sensors. Due to the detection time ambiguity, the RSS entries in vectors r1 and r2 will be mixed such that some measurements will come from device 1 and other measurements from device 2. A cost function, such as location mean square error (MSE) may be used to find the correct arrangement of the elements in vectors r1 and r2 in order to locate both devices and distinguish their RF signatures.

For example, a location estimation computation may employ a cost function like the one shown below to estimate the position u* of a single target device given a received RSS observation vector $r=[r_1 \ldots r_N]$:

$$u* = \operatorname*{argmin}_{u} \min_{P_{Tx}} \sum_{n=1}^{N} |r_n - R(P_{Tx}, u, u_n)|^2,$$

where $R(P_{Tx}, u, u_n) = P_{Tx} - J(u, u_n)$
and $J(u,u_n)$ is the estimated path loss (in dB) between location u and the $n^{th}$ sensor at position $u_n$, and is a mathematical representation of a path loss model. (Thus, n is the sensor index in this particular example.) The modeled RSS value $R(P_{Tx},u,u_n)$ is an estimate of the RSS that would be received at the $n^{th}$ sensor assuming a transmitter were located at position u and using transmit power $P_{Tx}$ using a path loss model. Thus, a modeled RSS vector consists of the RSS estimates at all of the sensors assuming the wireless transmitter (to be located) were located at position u and transmitting with a transmit power $P_{Tx}$.

If the cost function used is MSE, then only the correct permutation of the elements in vectors r1 and r2 should produce a small MSE. Therefore, it is possible to identify the correct permutations of vectors r1 and r2 by minimizing the MSE and simultaneously solving for the device location estimates u1 and u2 of devices 1 and 2, respectively.

The derivation of a MSE computation as one example is as follows. Let $r1_m$ and $r2_m$, $m=0, \ldots, M-1$ represent each of the M possible permutations of the elements in vectors r1 and r2. (Thus, m is the permutation index in this particular example.)

For an arbitrary RSS observation vector r, two functions are defined:

$$mmse(r) = \min_{u} \min_{P_{Tx}} \|r - R(P_{Tx}, u)\|^2$$

$$u_{mmse}(r) = \operatorname*{argmin}_{u} \min_{P_{Tx}} \|r - R(P_{Tx}, u)\|^2$$

The value mmse(r) is the minimum MSE between the observed and modeled RSS vectors over all candidate transmit powers of the wireless transmitter (target) device and candidate locations of the wireless transmitter (target) device. The value $u_{mmse}(r)$ is the wireless transmitter (target) device location that minimizes that MSE.

Let m0 be the minimizer of $mmse(r1_m)+mmse(r2_m)$ over all permutations $m=0, \ldots, M-1$. Assuming zero-mean Gaussian noise between the modeled and observed RSS vectors, one can show that the most likely permutations of r1 and r2 given observation vectors r1 and r2 are $r1_{m0}$ and $r2_{m0}$, respectively and the associated target device locations are $u_{mmse}(r1_{m0})$ and $u_{mmse}(r2_{m0})$, respectively. These computations are performed once after the devices are initially detected, not once per RSS measurement.

The following is a derivation to determine the number of permutations that need to be considered for the case where there are two devices that are transmitting and there are N sensors that are detecting the transmissions. There are two measurement vectors generated, referred to in this example as r and q, respectively, and the elements of these measurement vectors are mixed or jumbled as explained above such that $r=[rk_1 \ldots rk_N]$ and $q=[qk_1 \ldots qk_N]$. There are $M=2^{N-1}$ ways to permute the vectors:

$m = 0: [rk_1 rk_2 \ldots rk_N]$ and $[qk_1 qk_2 \ldots qk_N]$ $m = 1: [rk_1 qk_2 \ldots rk_N]$ and $[qk_1 rk_2 \ldots qk_N]$ $m = 2: [rk_1 rk_2 qk_3 \ldots rk_N]$ and $[qk_1 qk_2 rk_3 \ldots qk_N]$ $m = 3: [rk_1 qk_2 qk_3 \ldots rk_N]$ and $[qk_1 rk_2 rk_3 \ldots qk_N]$

...

$m = 2^{N-1}: [rk_1 qk_2 qk_3 \ldots qk_N]$ and $[qk_1 rk_2 rk_3 \ldots rk_N]$

Thus, there are $M=D^{N-1}$ permutations for the general case when there are D devices that are detected by the N sensors.

An example of an RSS positioning algorithm is described in commonly assigned and U.S. Pat. No. 7,236,128, entitled "System and Method for Locating Radio Emitters Using Self-Calibrated Path Loss Computation." Other receive signal strength position algorithms are known in the art, such as described in P. Krishnan, A. S. Krishnakumar, W Ju, C. Mallows, S. Ganu, "A System for LEASE: Location Estimation Assisted by Stationary Emitters for Indoor RF Wireless Networks", IEEE INFOCOM, 2004; P. Bahl et al, "RADAR: An In-Building RF-Based User Location and Tracking System", IEEE Infocom, March 2000.

While the foregoing has been described with respect to MSE as the cost function, the technique is not limited to MSE. An example of another cost function in which this technique may be used is minimum sum of error magnitudes.

Figure 3:
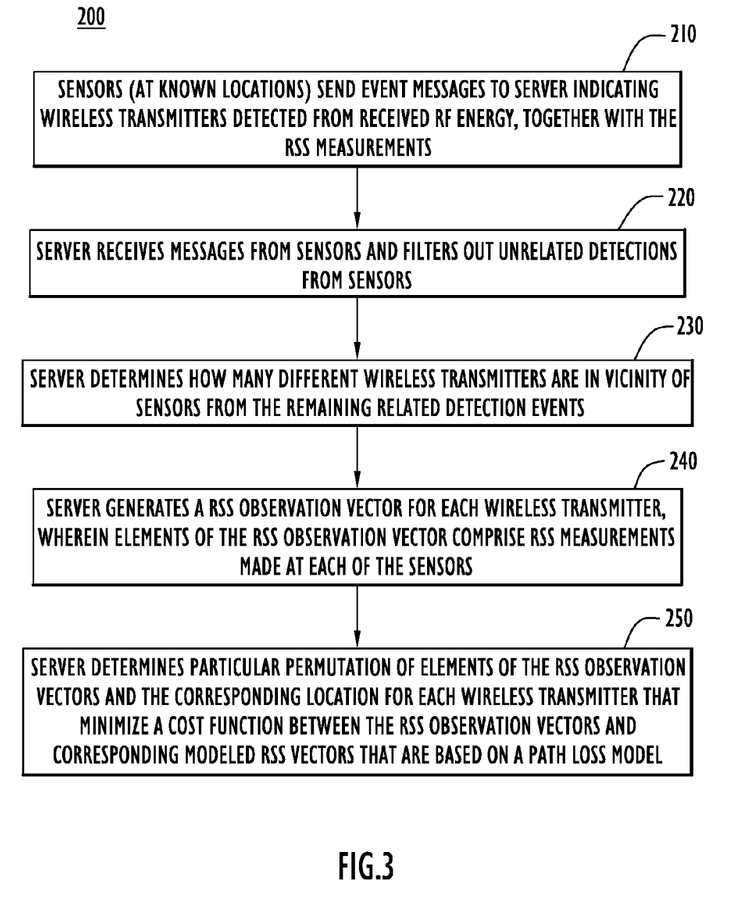
FIG. 3 is a flow chart depicting an ambiguity resolution process according to a first embodiment.

FIG. 3 illustrates a flow chart depicting how the server and sensors operate in performing a location MSE ambiguity resolution process 200 as described in the equations above. The sensors perform the function of receiving RF energy at known locations and making RSS measurements for received RF energy at the known locations. At 210, the sensors receive RF energy and detect occurrence of a one or more wireless transmitters whose signal protocol is not known or it is not otherwise possible to distinguish between transmissions from the wireless transmitters. The sensors generate RSS measurement data from the associated received RF energy and send messages to the server indicating that a wireless transmitter (or multiple wireless transmitters) have been detected, together with the RSS measurement data for those detections and time of reception of the RSS data. Next, at 220, the server receives the messages from the sensors and filters out unrelated detections. For example, the server filters out unrelated detection events by removing from consideration detection events (and their associated RSS data) that were not received within an appropriate time window of each another, have different RF fingerprint data (e.g., carrier frequency, modulation type) from one another, or were received from sensors that were not in sufficient proximity to one another to consider that the device detections may be the same. The detection events that remain after the filtering at 220 are referred to herein as related detection events. Said another way, the server filters out RSS measurements for RF energy based on time of reception relative to other RSS measurements, RF characteristics of the RF energy and the particular known locations where the RF energy was received. Then, at 230, the server determines how many different wireless transmitters are transmitting in the vicinity of the sensors from the remaining related detection events. The number of different wireless transmitters is equal to the maximum number of wireless transmitters reported from the sensors after the filtering at 230. At 240, the server generates or builds a RSS observation vector for each wireless transmitter (determined at 230), wherein elements of the RSS observation vector comprise RSS measurements made at each of the plurality of the sensors (i.e., at each known location). Then, at 250, the server determines the particular permutations of elements of the RSS observation vectors and the corresponding location for each wireless transmitter that minimize a cost function between the RSS observation vectors and corresponding modeled RSS vectors that are based on a path loss model. For example, minimum mean squared error may be the cost function that is used at 240, and in performing the computations at 250, the server disambiguates the RSS data from the sensors and determines the location each wireless transmitter associated with the disambiguated RSS data. In the event that not all of the sensors receive RF energy from all of the wireless transmitters (due to distance, etc.), the server will note this and fill in a small RSS measurement value (e.g., the noise floor in a 802.11 20 MHz channel) to the appropriate element of the RSS observation vector for that wireless transmitter.

Figure 4:
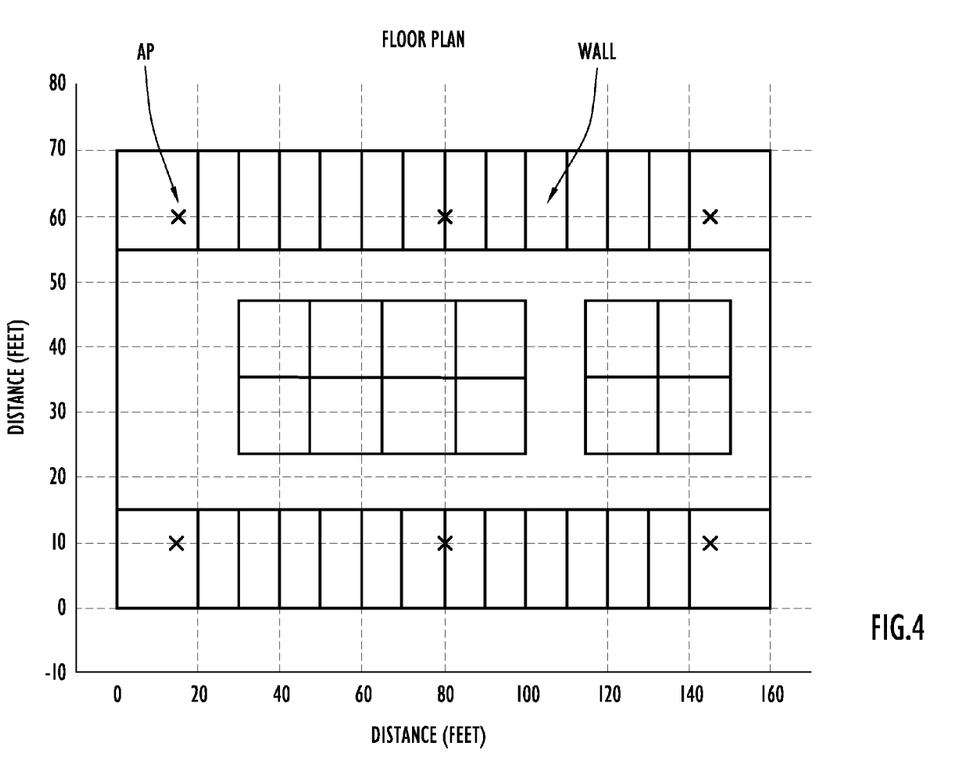
FIG. 4 is a diagram depicting a layout for a simulation associated with the first embodiment.
Figure 5:
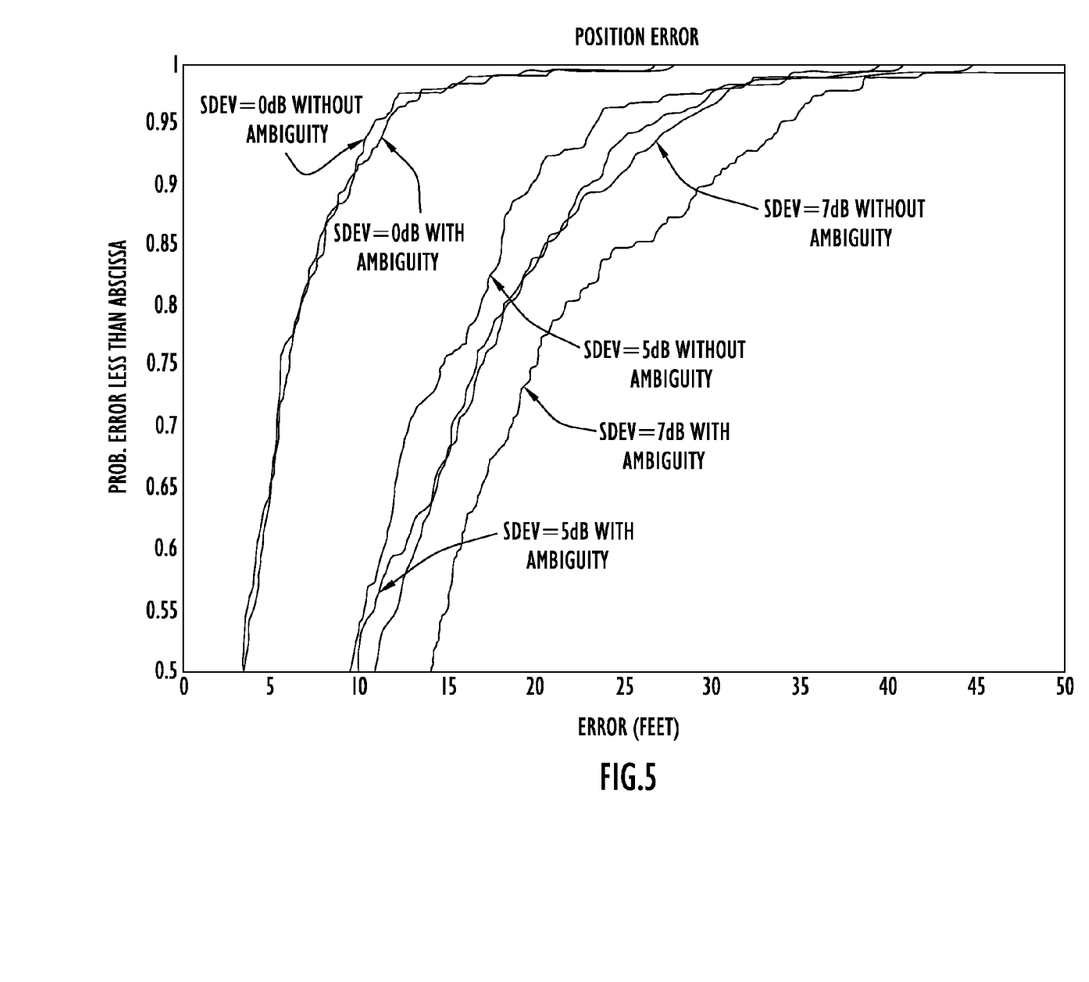
FIG. 5 illustrates plots for data associated with the simulation shown in FIG. 4.

With reference to FIGS. 4 and 5, simulations for the location MSE technique are described. This approach was simulated to characterize its performance with ambiguity (with mixing) and without ambiguity (without mixing) with respect to the RSS measurements. In the simulation, 2 transmitters ($P_{Tx}$=15 dBm) were placed in random positions within a 160'×70' office space as shown in FIG. 4. RSS was measured at 6 APs at known locations. The experiment was repeated 100 times (100 experiments*2 randomly placed devices per experiment=200 position estimates per simulation run). The path loss model used for the experiment was:

Path loss=40 dB at one meter;
Path loss exponent=1.52; and
4 dB attenuation per wall.

The path loss model is assumed to have been perfectly calibrated over a 2D grid with 6 ft×6 ft grid spacing, with log-normal fading was used with a standard deviation=0, 5, 7 dB.

From the simulation, it is observed that performance degradation between mixed (jumbled) and non-mixed (non-jumbled) RSS cases increases with increasing lognormal fade standard deviation.

Pseudo-Mac Identifier Technique

Figure 6:
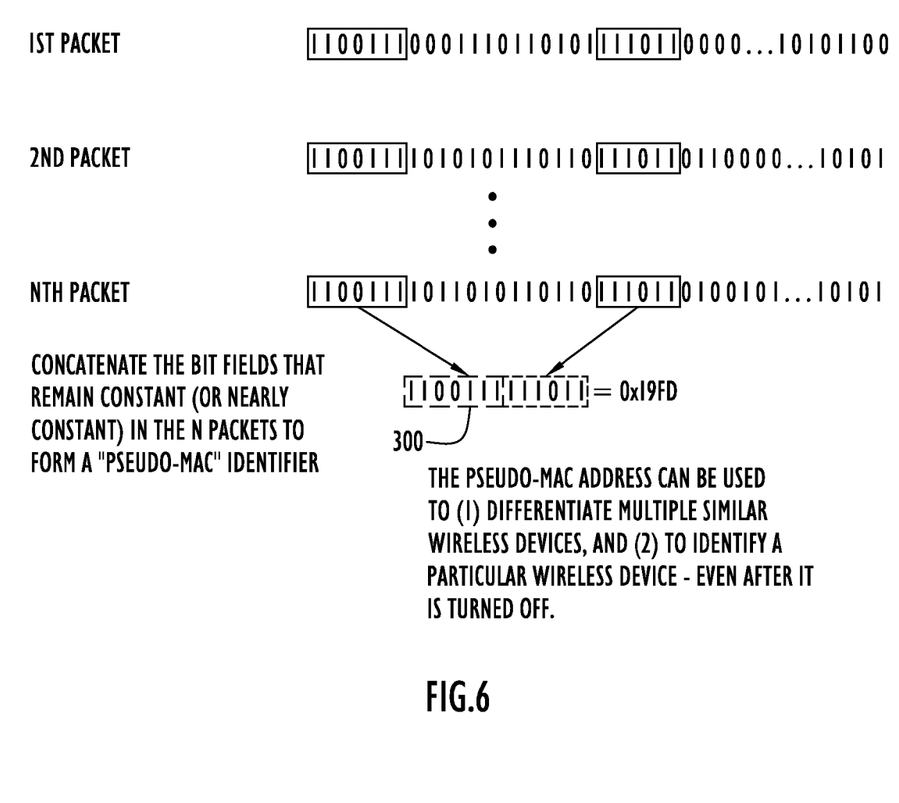
FIG. 6 is a diagram depicting an ambiguity resolution process according second embodiment.
Figure 7:
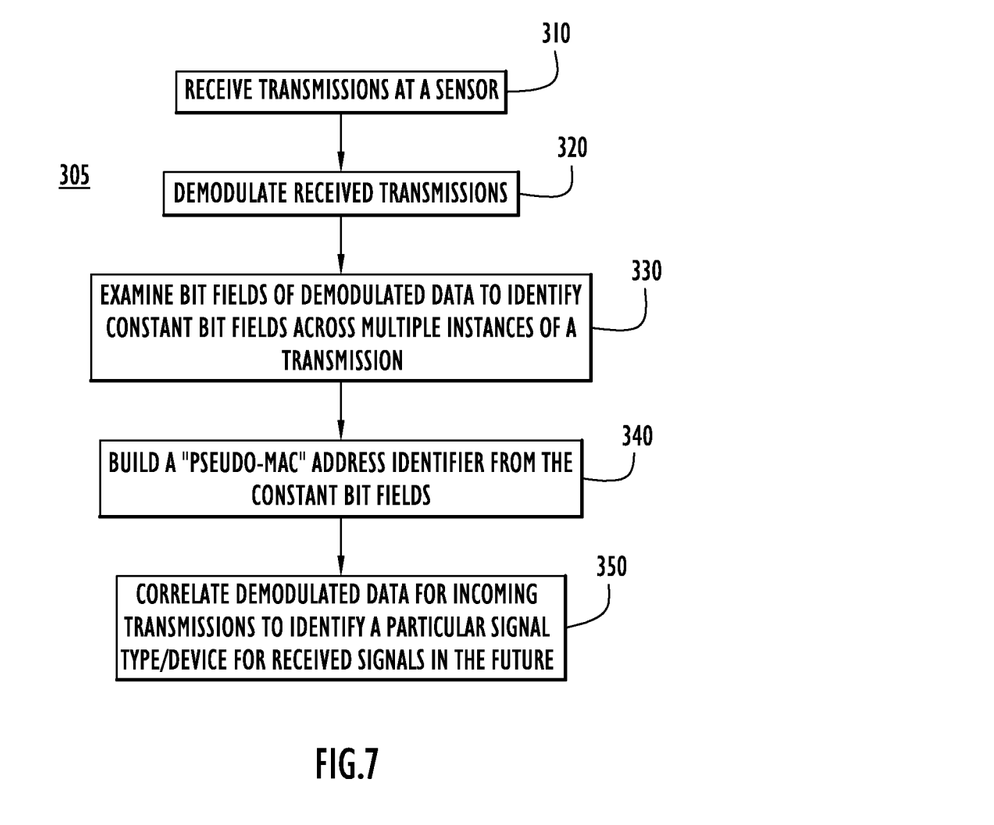
FIG. 7 is a flow chart for the ambiguity resolution process of the second embodiment.

Turning to FIGS. 6 and 7, another ambiguity resolution process is described. In this technique, an identifier, called a "pseudo-MAC" address, is created from the demodulated data produced from received RF energy.

FIG. 6 graphically illustrates an example of creating the identifier. A sensor receives transmissions from a source device and demodulates (e.g., QAM, PSK, FSK, OFDM demodulation) the received transmissions to produce a demodulated signal comprising "1's" and "0's". The sensor does this for multiple packets or instances of received transmissions from a source. For example, FIG. 6 shows the demodulated data signal for a first packet (or frame), for a second packet, and so on. The sensor examines the bit fields of the demodulated signal to locate bit fields that are constant or nearly constant from one packet (frame) to another. These constant bit fields are concatenated or merged together to form the identifier shown at 300. The identifier 300 can be used (in the future) to differentiate multiple similar wireless source devices and to identify a particular wireless device, even after it is turned off or not otherwise transmitting.

Referring now to FIG. 7, one example of a method 305 for creating and using the pseudo-MAC address identifier is described. At 310, a sensor receives RF energy from multiple wireless transmitters. At 320, the sensor demodulates the one or more of the received wireless transmission to produce a corresponding demodulated signal comprised of "1's" and "0's". Next, at 330 the sensor examines the bit fields of the demodulated signal resulting from multiple packets or transmissions of a device and identifies those bit fields in the demodulated signal that are constant, i.e., do not change from one transmission to the next. At 340, the sensor then merges those constant bit fields together to form an identifier for a source device. At 350, the identifier can then be used to distinguish between wireless transmitter devices or to identify a particular wireless transmitter device from received wireless transmissions. The server can then use the RSS measurement data generated by the sensors (that have been distinguished using the pseudo-MAC identifiers at the sensors) to perform location measurements in order to estimate locations of the wireless transmitter devices.

Sensor Synchronization Technique

Figure 8:
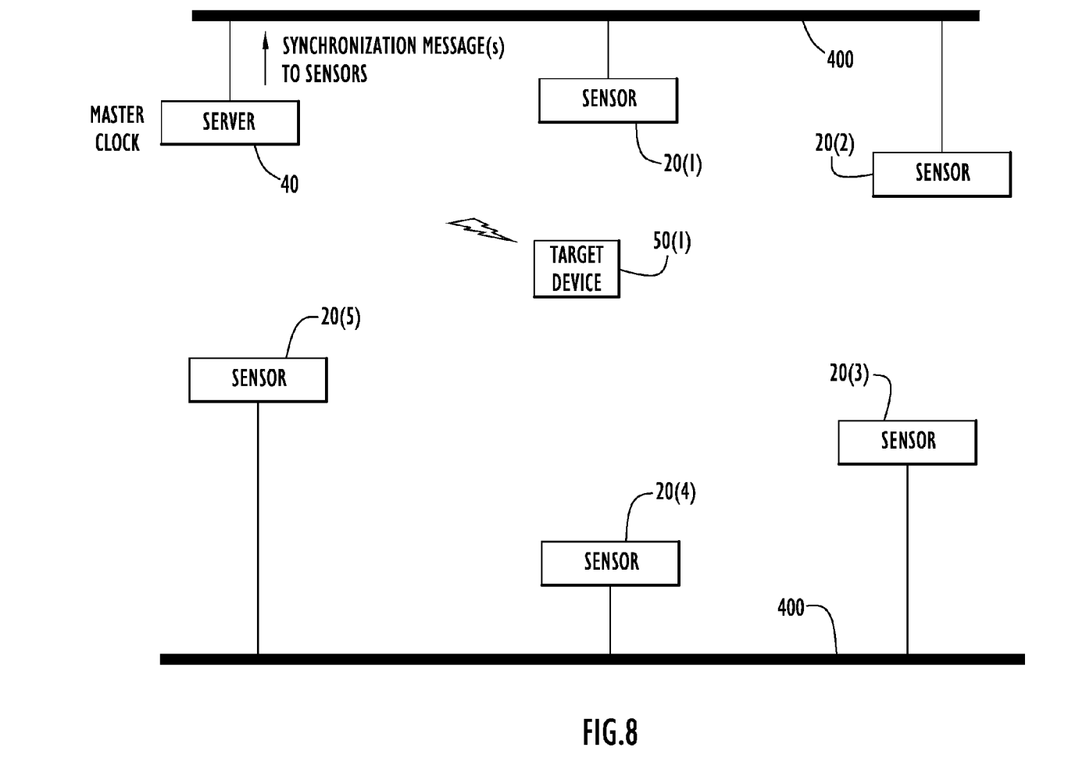
FIG. 8 is a diagram of a system in which an ambiguity resolution process is used according to a third embodiment.
Figure 9:
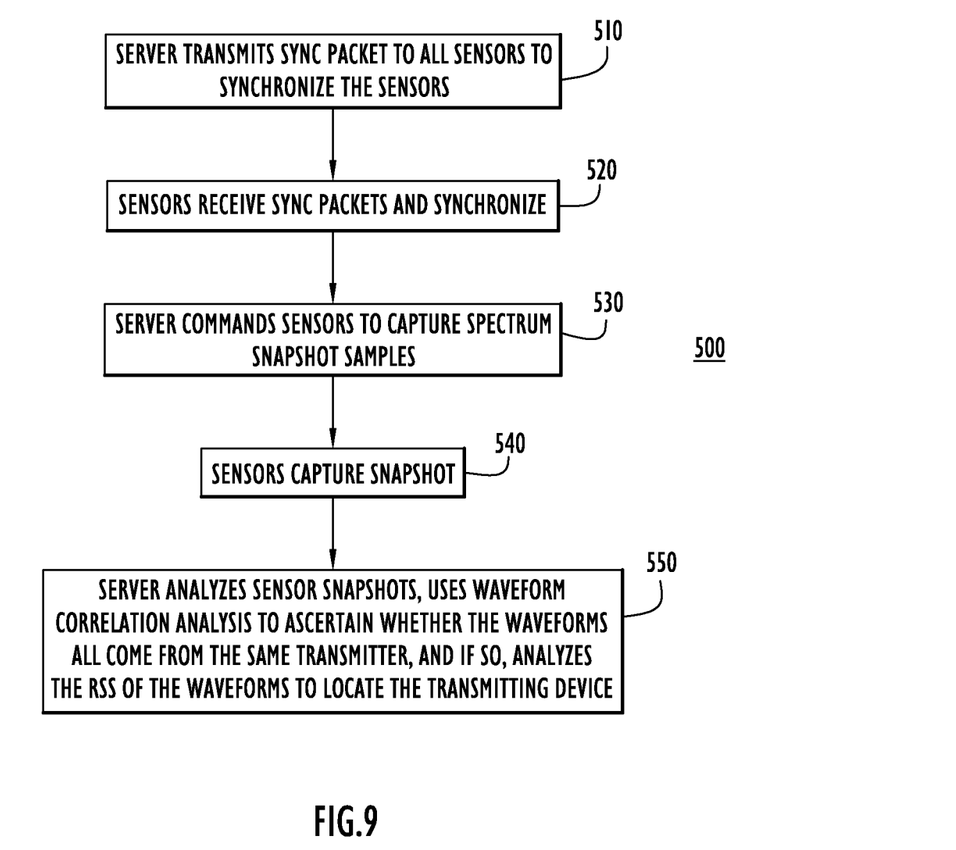
FIG. 9 is a flow chart for the ambiguity resolution process of the third embodiment.
Figure 10:
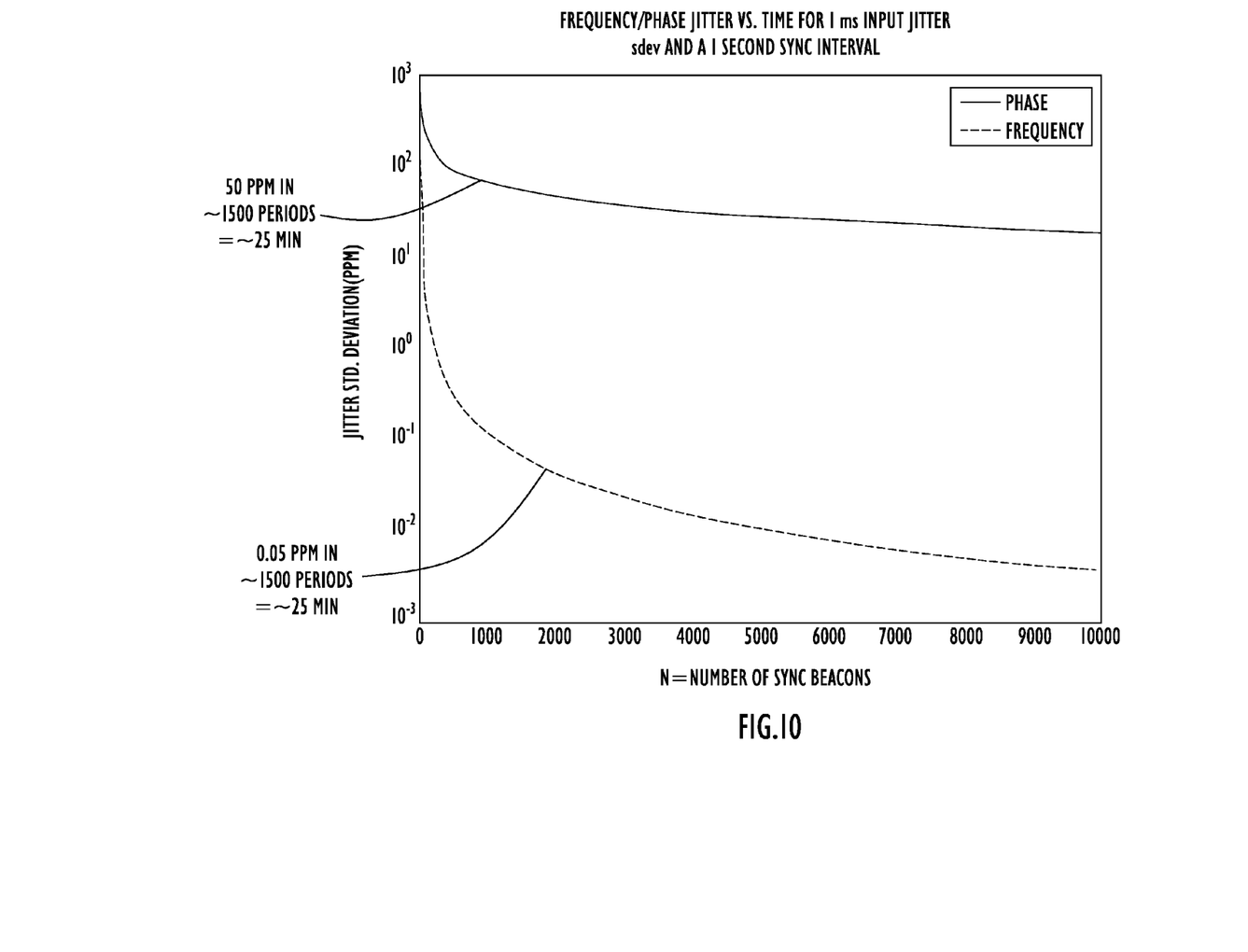
FIG. 10 is a diagram showing plots associated with performance of the ambiguity resolution process of the third embodiment.

Turning to FIGS. 8-10, another ambiguity resolution technique is described that is useful to distinguish between source devices of multiple transmissions. As shown in FIG. 8, each of the sensors 20(1)-20(5) is connected to a wired (or wireless) network 400 as is the server 40. The server 40 communicates with the sensors 20(1)-20(5) and receives measurement data made by the sensors from RF energy received by the sensors. In addition, the server 40 generates and transmits to all of the sensors 20(1)-20(5) a synchronization message in order to synchronize the sensors 20(1)-20(5) to a common time base. The sensors 20(1)-20(5) can therefore synchronize their capture of received RF energy to the common time base so that the server 40 can analyze the measurements made by the sensors on the RF energy captured by all of the sensors 20(1)-20(5) with respect to a common time base. This makes it much easier for the server to determine whether the RF energy received by more than one sensor corresponds to RF energy from the same source device, i.e., target device 50(1) shown in FIG. 8.

Referring now to FIG. 9, a process 500 is shown by which the server synchronizes the sensors 20(1)-20(5) for purposes of resolving ambiguity with respect to RF energy received by the sensors 20(1)-20(5). At 510, the server 40 periodically (or occasionally) transmits a synchronization packet to all of the sensors 20(1)-20(5) that the sensors use to synchronize their own clocks. For example, the server 40 sends a multicast sync beacon packet to each of the sensors 20(1)-20(5) over the network 40 to the sensors 20(1)-20(5). The beacon packets may be time-stamped at both ingress and egress to reduce the timing jitter and bias at the sensors 20(1)-20(5). At 520, the sensors 20(1)-20(5) receive the synchronization packets and estimate frequency and phase error between their local free-running clocks and a master clock (at the server 40), for example, using a software phase locked loop and the beacon packets received from the server 40.

At 530, the server 40 transmits a command to the sensors 20(1)-20(5) to capture and store a snapshot of RF energy on a particular channel, for example. At 540, the sensors 20(1)-20(5) capture the received RF energy (also called spectrum snapshot) and send the captured spectrum snapshot data to the server 40. Since the sensors 20(1)-20(5) were synchronized to a common time base, when the server 40 receives the spectrum snapshot data from the sensors 20(1)-20(5), the server 40 analyzes the spectrum snapshot data received at each sensor to ascertain whether the sensors 20(1)-20(5) all received the same packet sent by the same transmitter. If so, at 550 the server 40 uses the RSS data derived from the sensors' snapshot data to compute the location of the target device.

In one example, the sync beacons arrive at the sensors at times $$t_n = nT + t_0 + v_n, \; n=0, 1, \ldots, L-1$$

where T is the sync beacon period and $v_n$ is zero-mean additive white Gaussian noise (AWGN), and $t_0$ is the time that the server sent the sync beacon.

If the sensors use linear regression to estimate T and $t_0$, i.e., $$\hat{T} = \frac{12\left(\sum_{n=0}^{L-1} n \cdot t_n - \frac{L+1}{2}\sum_{n=0}^{L-1} t_n\right)}{L(L+1)(L-1)}$$

$$\hat{t}0 = \frac{1}{L}\sum_{n=0}^{L-1} t_n - \frac{L+1}{2}\hat{T}$$

One can show that $$Var\hat{T} \approx 12 \cdot \sigma^2 / L^3, \text{ and}$$

$$Var\hat{t}0 \approx 4 \cdot \sigma^2 / L$$

where $\sigma 2 = Var \; v_n$. The plots shown in FIG. 10 illustrate standard deviation versus number of sync beacons for a simulation.

For example, suppose there are M sensors, and $y^{<i>} = [y^{<i>}_0 \; y^{<i>}_1 \ldots y^{<i>}_{K-1}]^T$ represents the (complex) snapshot waveform samples received at sensor i for i=1 ... M, and where K is the maximum number of waveform samples received over all sensors for a time interval under consideration. Using the waveform received at sensor 1 as a reference, and assuming zero thermal noise and interference, the waveform received at sensor 2 can be written as a linear convolution of the waveform received at sensor 1 with a complex impulse response vector, i.e., $y^{<2>} = y^{<1>} * h2$, where * represents the convolution operator, and h2 is a complex impulse response vector to account for differences in time-of-flight, carrier amplitude and phase, and linear distortion between the transmitter and the two sensors. Without noise and distortion, the same can be said of sensors 3 through M, i.e., $y^{<3>} = y^{<1>} * h3, \ldots, y^{<M>} = y^{<1>} * hM$ for some choice of impulse responses h3, ..., hM.

The following analysis may be used to verify whether the same packet was received from the same transmitter at each of the sensors in the scenario above:

Decide that the same waveform is received at sensors 1 ... M if:

1. Measured received packet arrival time (as measured on the master clock to which each of the sensors is synchronized) is nearly identical at each sensor (there will be slight differences caused by time-of-flight effects); and 2. The waveforms received at each sensor are the same, after removing the effects for time-of-flight, carrier amplitude/phase and linear distortion differences, i.e., $$\max\left\{\min_{h2}\|y^{<1>} - y^{<2>} * h2\|^2, \right. \tag{A}$$

$$\left. \min_{h3}\|y^{<1>} - y^{<3>} * h3\|^2, \ldots, \min_{hM}\|y^{<1>} - y^{<M>} * hM\|^2\right\} < T$$

for some appropriate threshold T, where K is the maximum number of waveform samples received over all sensors for a time interval under consideration, h2, h3, ..., hM represent complex impulse response vectors that account for differences in time-of-flight, carrier amplitude and phase, and linear distortion between sensor (receiver device) 1 and sensor 2, between sensor 2 and receiver device 3, ..., and between sensor M−1 and sensor M, respectively, and where * represents the convolution operator.

A closed form expression for the minimizations in equation (A) can be derived using standard matrix linear algebra techniques.

If the signal to interference ratio (SNIR) is not sufficiently high at one or more of the sensors for a particular test case, the threshold test in equation (A) will fail and the server may need to direct the sensors to make another synchronized snapshot measurement. Once the server has determined that each sensor has received the same transmission with adequate SNIR, the server directs each sensor to measure the RSS of that transmission and uses the RSS measurements to locate the transmitter.

The above description is intended by way of example only.

What is claimed is:

1. A method comprising:

estimating a number of different wireless transmitters in a vicinity of a plurality of known locations based on radio frequency (RF) energy received at the plurality of known locations from the wireless transmitters, wherein the wireless transmitters are at locations which are unknown but which are to be determined;

building a received signal strength (RSS) observation vector for each wireless transmitter whose location is to be determined, wherein elements of the RSS observation vector comprise RSS measurements for two or more of the wireless transmitters made at each of the plurality of known locations; and determining permutations of elements of each of the RSS observation vectors that represent RSS measurements from a corresponding wireless transmitter and the corresponding location for each wireless transmitter that together minimize a cost function between the RSS observation vectors and corresponding modeled RSS vectors that are based on a path loss model, wherein the modeled RSS vectors are an estimate of the RSS measurements that would be received at the known locations from a transmitter that transmits with a transmit power according to the path loss model, wherein the permutations of elements of the RSS observation vectors that minimize a mean square error cost function between the RSS observation vectors and the corresponding modeled RSS vectors; and wherein the determining comprises determining permutations of elements of an RSS observation vector r such that:

$$mmse(r) = \min_{u}\min_{P_{Tx}}\|r - R(P_{Tx}, u)\|^2$$

$$u_{mmse}(r) = \operatorname{argmin}_{u}\min_{P_{Tx}}\|r - R(P_{Tx}, u)\|^2,$$

wherein mmse(r) is the minimum mean square error between the RSS observation vectors and modeled RSS vectors over all candidate transmit powers of a given wireless transmitter and candidate locations of the wireless transmitter, $u_{mmse}(r)$ is the wireless transmitter location that minimizes that mean square error, $r1_m$ and $r2_m$, m=0 . . . , M−1 represent each of M possible permutations of the elements in RSS observation vectors r1 and r2, and m is a permutation index.

2. The method of claim 1, wherein determining is based on the corresponding modeled RSS vectors that are computed over a plurality of candidate transmit powers for each wireless transmitter whose location is to be determined.

3. The method of claim 1, wherein the cost function is mean square error.

4. The method of claim 1, and further comprising measuring the RSS of RF energy received at the plurality of known locations, and filtering out RSS measurements for RF energy based on time of reception relative to other RSS measurements, RF characteristics of the RF energy and the particular known locations where the RF energy was received.

5. A system comprising:
a plurality of receiver devices each at a known location, wherein each receiver device is configured to receive radio frequency (RF) energy from wireless transmitters that are in a vicinity of the plurality of receiver devices and to make received signal strength (RSS) measurements therefrom, wherein the wireless transmitters are at locations which are unknown but which are to be determined; and a computing device that is configured to communicate with the plurality of receiver devices and to receive RSS measurements made by the plurality of receiver devices, wherein the computing device is further configured to estimate the number of different wireless transmitters in a vicinity of the plurality of receiver devices based on the RF energy by the plurality of receiver devices, to build an RSS observation vector for each wireless transmitter whose location is to be determined, wherein elements of the RSS observation vector comprise RSS measurements for two or more of the wireless transmitters made by each of the receiver devices, and to determine permutations of elements of each of the RSS observation vectors that represent RSS measurements from a corresponding wireless transmitter and the corresponding location for each wireless transmitter that together minimize a cost function between the RSS observation vectors and corresponding modeled RSS vectors that are based on a path loss model, wherein the modeled RSS vectors are an estimate of the RSS that would be received at the known locations from a transmitter that transmits with a transmit power according to the path loss model, wherein the computing device is configured to compute the permutations of elements of the RSS observation vectors that minimize a mean square error cost function between the RSS observation vectors and the corresponding modeled RSS vectors; and wherein determining permutations of elements of an RSS observation vector r such that:

$$mmse(r) = \min_{u} \min_{P_{Tx}} \|r - R(P_{Tx}, u)\|^2$$

$$u_{mmse}(r) = \operatorname*{argmin}_{u} \min_{P_{Tx}} \|r - R(P_{Tx}, u)\|^2,$$

wherein $mmse(r)$ is the minimum mean square error between the RSS observation vectors and modeled RSS vectors over all candidate transmit powers of a given wireless transmitter and candidate locations of the wireless transmitter, $u_{mmse}(r)$ is the wireless transmitter location that minimizes that mean square error $r1_m$ and $r2_m$, m=0 . . . , M−1 represent each of M possible permutations of the elements in RSS observation vectors r1 and r2, and m is a permutation index.

6. The system of claim 5, wherein the computing device is configured to compute the corresponding modeled RSS vectors over a plurality of candidate transmit powers for each wireless transmitter whose location is to be determined.

7. The method of claim 1, and further comprising if RF energy from a wireless transmitters is not received at one of the plurality of known locations, filling in a small RSS measurement value to an appropriate element of the RSS observation vector for that wireless transmitter.

* * * * *